UNITED STATES PATENT OFFICE.

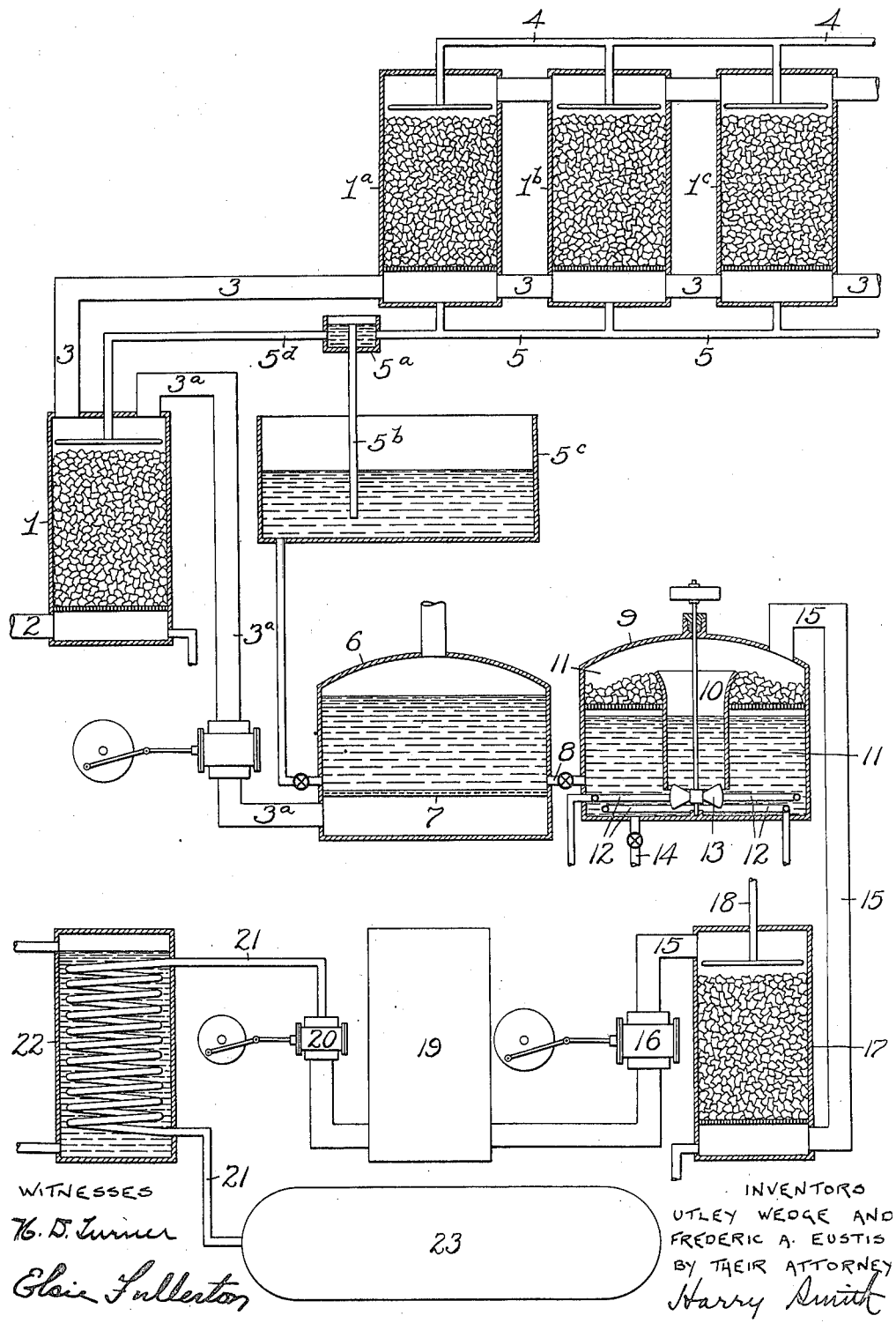

UTLEY WEDGE, OF ARDMORE, PENNSYLVANIA, AND FREDERIC A. EUSTIS, OF MILTON, MASSACHUSETTS.

RECOVERING $SO_2$ OR THE LIKE FROM GASES CONTAINING THE SAME.

1,260,492.  Specification of Letters Patent.  Patented Mar. 26, 1918.

Application filed May 29, 1915. Serial No. 31,208.

*To all whom it may concern:*

Be it known that we, UTLEY WEDGE and FREDERIC A. EUSTIS, citizens of the United States, residing, respectively, in Ardmore, Pennsylvania, and Milton, Massachusetts, have invented certain Improvements in Recovering $SO_2$ or the like from Gases Containing the Same, of which the following is a specification.

Our invention consists of a method of segregating and recovering gases from others with which they may be associated, the object of our invention being to effect a high percentage of recovery at low cost.

We have, for convenience, in our specification and claims, referred to the recovery of $SO_2$ from furnace gases, but this is to be regarded simply as a selected example and not as a limitation, as our invention applies as well to the recovery of gases other than $SO_2$ and from gases other than furnace gases.

The accompanying drawing represents, in diagrammatic form, apparatus for the practice of our process.

It should be understood, however, that, owing to the limits to which the size of the drawing sheet is restricted and to the desire to represent as clearly as possible the construction of those units of the apparatus which are shown in section, no attention has been paid in the drawing to the relative dimensions or disposition of the various units of the apparatus.

A brief description of the complete process is as follows:

Part of the furnace gases, previously cooled and enriched with $SO_2$, are brought into contact with liquid which will absorb $SO_2$. The enriching of the furnace gases is effected by bringing the initial supply thereof into contact with a portion of said liquid after it has absorbed $SO_2$. Part of the enriched gases are passed through the remaining portion of said liquid so as to cause the percentage of $SO_2$ therein to increase. The $SO_2$ is then driven off by subjecting the liquid to heat and vacuum, with or without agitation, and, while still under vacuum, is then deprived of any free liquid with which it may be associated, the dry gas being then compressed, to the liquefying point, and finally cooled.

In the drawing 1, $1^a$, $1^b$, $1^c$, etc., represent a series of towers of any suitable dimensions, the tower 1 being packed with coke, slag, or other insoluble material in such form that liquid descending through the tower will present an extended superficial area for contact with the gas from the furnace. This gas enters the tower at or near the bottom through a pipe 2 and escapes at or near the top of the tower through a pipe 3, the latter being in communication, at or near the bottom, with the towers $1^a$, $1^b$, $1^c$, etc., of which any desired number may be employed, the pipe 3 thus supplying gas to each of these towers to which water or other liquid capable of absorbing $SO_2$ is admitted at the top through a pipe 4.

The towers $1^a$, $1^b$, $1^c$, etc., are packed either with coke or other insoluble material, or with limestone or other soluble material which will increase the absorptive capacity of the liquid, or the packing contained in these towers may be in part of such soluble material and in part of insoluble material. The gases escaping from the upper portions of the towers $1^a$, $1^b$, $1^c$, etc., are discharged into the atmosphere, or may be subjected to treatment for the recovery of other components of the same, if desired.

The liquid containing $SO_2$ escapes from the bottoms of the towers $1^a$, $1^b$, $1^c$, etc., through a pipe 5 into a vessel $5^a$ which has an overflow pipe $5^b$, the latter discharging into a storage vessel $5^c$. Another pipe $5^d$ leads from the vessel $5^a$ into the upper portion of the tower 1 within which it may be provided with any suitable form of distributer so as to discharge into the mass of coke or other packing contained in said tower.

The furnace gases entering the lower portion of the tower 1 through the pipe 2 are normally at high temperature, consequently they will, in rising through said tower, heat the liquid containing $SO_2$ which is passing downwardly through the same, with the twofold result that the rising gases will be cooled and the $SO_2$ will be driven from the liquid, and returned to the furnace gases. The gases escaping through the pipe 3 to the towers $1^a$, $1^b$, $1^c$, etc., will therefore be richer in $SO_2$ than the original furnace gases, and will have had their temperature so reduced that they will not heat the liquid in the towers $1^a$, $1^b$, $1^c$, etc., to such an extent as to prevent it from absorbing $SO_2$.

If the initial temperature of the gases entering the tower 1 is not high enough, such temperature may be artificially increased, or a separate heating agent may be introduced into the tower 1 to supply such heat deficiency in the lower portion of the tower, without, however, unduly heating the gases escaping from the upper portion thereof.

Some of the enriched gases escape from the upper portion of the tower 1 through a pipe $3^a$ and are conducted to the lower portion of a vessel 6 beneath a horizontal partition 7 therein, liquid containing $SO_2$ flowing from the storage vessel $5^c$ either continuously or at intervals into the vessel 6 above said partition 7.

The partition 7 is composed of porous tile or other material which will permit an upflow of gas through the same but will prevent downflow of liquid while such upflow of gas is maintained.

The liquid entering the vessel 6 is somewhat enriched by the gas rising through the liquid, but still contains only a very dilute solution of gas.

The liquid containing $SO_2$ may be drawn off from the vessel 6, either continuously or at intervals, through a valved pipe 8 into a vacuum pan 9 which preferably contains a central well 10 and a surrounding chamber 11 whose upper portion contains a mass of packing such as that contained in the towers 1, $1^a$, $1^b$, $1^c$, etc. The lower portion of the chamber 11 contains a suitable heating device, such for instance, as a steam coil 12, perforate or imperforate, as desired, and the lower portion of the well 10 contains an impelling device 13, for causing the liquid to rise through the well and be discharged over the top of the well casing onto the packing in the upper portion of the chamber 11, through which it descends into said chamber.

The heat imparted to the contents of the chamber 11 by the steam coil 12, combined with the vacuum or partial vacuum, drives off the $SO_2$ from the liquid. The action is aided and accelerated by the superficially extensive exposed surface of the liquid in its passage from well 10 into the chamber 11 through the packing, and by the agitation of the liquid; though good results may be obtained without agitation, the essential condition being the exposure of the liquid to the action of a vacuum or partial vacuum (such exposure preferably being made as complete as possible by dividing the liquid into superficially extensive films) and simultaneously heating the liquid to a point just short of the boiling temperature of the liquid under the vacuum. The rapid release of the $SO_2$ effects such lowering of the temperature of the liquid in the vacuum pan, that with ordinary care, the generation of steam therein will be impossible.

If the operation of the vacuum pan 9 is intermittent, it may have a valved discharge pipe 14 through which the liquid, deprived of its $SO_2$, may escape preparatory to the recharging of the pan from the vessel 6, or, instead of using a single vacuum pan a plurality of such pans connected in series may be employed, and instead of extracting $SO_2$ from successive batches of liquid containing the same the liquid may be permitted to flow slowly through the vacuum apparatus, especially if a plurality of vacuum pans connected in series are employed. Suitable means are, of course, employed for causing and controlling discharge of liquid from the vacuum pan or pans if vacuum is maintained during such discharge.

The exhaust pipe 15 of the vacuum pan communicates with the inlet of a vacuum pump 16 but interposed between said pan and pump are means for separating from the $SO_2$ any liquid which may by any chance be associated with it. Any desired means for this purpose may be employed, the means shown in the drawing comprising a tower 17 substantially similar to the tower 1 but provided at the top with a pipe 18 for supplying sulfuric acid or other agent having an affinity for the liquid, the $SO_2$ entering the lower portion of the tower 17, rising therein in contact with the descending sulfuric acid, or other agent, and escaping from the top of the tower to the vacuum pump 16, from which it is discharged into a storage vessel 19.

The fact that the freeing of the $SO_2$ from any liquid that may be associated therewith is effected under vacuum facilitates the separation, and may render the force of gravity alone sufficient for the purpose.

The dry $SO^2$ is withdrawn from the storage vessel 19 by means of a compression pump 20 whereby it is, by preference, subjected to a pressure sufficient to cause liquefaction, the outlet of the compressor discharging through a pipe 21 into a cooler 22, in which the said pipe 21 is coiled or otherwise so disposed as to form a passage presenting an extended surface area for the action of the water or other cooling agent rising through the vessel 22.

The $SO_2$ is thereby deprived of heat and, properly cooled and liquefied, is discharged from the pipe 21 into a suitable storage tank 23.

If liquefaction is not desired the compressor 20 may be omitted, or, if it is used, it may not compress the gas to the point of liquefaction.

If desired, the coil 12 in the vacuum pan may be heated by the exhaust steam from the engine which drives the vacuum pump and compressor or by the exhaust steam from said pump and compressor if they are directly driven.

Palpable modifications of our invention are the enriching of the furnace gas on its way to the absorbers without subsequently passing enriched gas through the liquid from the absorbers, in which case all of the enriched gas will pass from the tower 1 through the pipe 3 to the absorbers, the pipe 3ª and vessel 6 being dispensed with and the liquid being conveyed directly from the storage tank 5ᶜ to the vacuum pan, or the enriched gases from the tower 1 may all discharge through the pipe 3ª into the vessel 6, the furnace gases being cooled but not enriched on their way to the absorption towers, or all of the enriched gases may pass to the pan 6, the escaping gases from the latter being directed to the absorption towers, from which the liquid may pass in part to the tower 1 and in part to the pan 6, or all to the tower 1, the pan 6 having an independent liquid supply.

We claim:

1. The mode herein described of recovering $SO_2$ or the like from furnace or other gases containing the same, said mode consisting in causing liquid to absorb the $SO_2$ from said gases, and then, while said liquid is under less than atmospheric pressure, heating it to free the $SO_2$ therefrom.

2. The mode herein described of recovering $SO_2$ or the like from furnace or other gases containing the same, said mode consisting in causing liquid to absorb $SO_2$ from said gases, and then, while said liquid is under less than atmospheric pressure, agitating and heating it to free the $SO_2$ therefrom.

3. The mode herein described of recovering $SO_2$ or the like from furnace or other gases containing the same, said mode consisting in causing liquid to absorb $SO_2$ from said gases, and then, while said liquid is under less than atmospheric pressure, causing it to flow over surfaces presenting an extended superficial area and at the same time heating it in order to free the $SO_2$ from said liquid.

4. The mode herein described of recovering $SO_2$ or the like from furnace or other gases containing the same, said mode consisting in causing liquid to absorb $SO_2$ from said gases, then extracting the $SO_2$ from said liquid, and then depriving said $SO_2$, while under less than atmospheric pressure, of any liquid with which it may still be associated.

5. The mode herein described of recovering $SO_2$ or the like from furnace or other gases containing the same, said mode consisting in causing liquid to absorb $SO_2$ from said gases, then freeing the $SO_2$ from said liquid while the latter is under pressure less than that of the atmosphere, and then while the vacuum or partial vacuum is still maintained, removing from said $SO_2$ any liquid that may still be associated therewith.

6. The mode herein described of recovering $SO_2$ or the like from furnace or other gases containing the same, said mode consisting in first increasing the percentage of $SO_2$ in said gases, then causing liquid to absorb $SO_2$ from the gases thus enriched, and effecting an enrichment of the gases by adding thereto $SO_2$ extracted from a portion of said liquid.

7. The mode herein described of recovering $SO_2$ or the like from furnace or other gases containing the same, said mode consisting in first increasing the percentage of $SO_2$ in said gases, then causing liquid to absorb $SO_2$ from the gases thus enriched, effecting an enrichment of the gases by adding thereto $SO_2$ extracted from a portion of said liquid, and then freeing the $SO_2$ from the remaining portion of said liquid.

8. The mode herein described of recovering $SO_2$ or the like from furnace or other gases containing the same, said mode consisting in first increasing the percentage of $SO_2$ in said gases, then causing the liquid to absorb $SO_2$ from the gases thus enriched, and then bringing a portion of said liquid into contact with the hot gases on their way to the absorber so as to simultaneously cool said gases and enrich the same by adding thereto the $SO_2$ driven off by the heat from the liquid thus diverted.

9. The mode herein described of recovering $SO_2$ or the like from furnace or other gases containing the same, said mode consisting in first increasing the percentage of $SO_2$ in said gases, then causing the liquid to absorb $SO_2$ from the gases thus enriched, then bringing a portion of said liquid into contact with the hot gases on their way to the absorber so as to simultaneously cool said gases and enrich the same by adding thereto the $SO_2$ driven off by the heat from the liquid thus diverted, and then freeing the $SO_2$ from the remainder of said liquid.

10. The mode herein described of recovering $SO_2$ or the like from furnace or other gases containing the same, said mode consisting in first reducing the initial temperature of said gases, then causing liquid to absorb $SO_2$ therefrom, then diverting a portion of said liquid and subjecting the same to the action of heat so as to drive off the $SO_2$ from said liquid, and then passing the $SO_2$ through the remainder of said liquid so as to increase the percentage of $SO_2$ contained in the latter.

11. The mode herein described of recovering $SO_2$ or the like from furnace or other gases containing the same, said mode consisting in first increasing the percentage of $SO_2$ in said gases, then causing liquid to absorb $SO_2$ therefrom, then diverting a portion of said liquid and subjecting the same to the action of the hot gases on the way to the absorber so as to add to said gases the $SO_2$ driven off from the liquid by the heat, and then passing a portion of the gases thus enriched through the remainder of said liquid so as to increase the percentage of $SO_2$ contained in the latter.

12. The mode of recovering $SO_2$ or the like from furnace or other gases containing the same, said mode comprising causing liquid to absorb $SO_2$ from said gases, and then, while said liquid is under less than atmospheric pressure, heating to a temperature approximate to but not exceeding the boiling temperature under said pressure to free the $SO_2$ therefrom.

In testimony whereof, we have signed our names to this specification, in the presence of two subscribing witnesses.

UTLEY WEDGE.
FREDERIC A. EUSTIS.

Witnesses:
KATE A. BEADLE,
HAMILTON D. TURNER.